United States Patent
Johns et al.

(10) Patent No.: US 9,805,203 B2
(45) Date of Patent: Oct. 31, 2017

(54) COOPERATIVE STATIC AND DYNAMIC ANALYSIS OF WEB APPLICATION CODE FOR FINDING SECURITY VULNERABILITIES

(71) Applicants: Martin Johns, Karlsruhe (DE); Sebastian Lekies, Karlsruhe (DE); Benjamin Raethlein, Karlsruhe (DE)

(72) Inventors: Martin Johns, Karlsruhe (DE); Sebastian Lekies, Karlsruhe (DE); Benjamin Raethlein, Karlsruhe (DE)

(73) Assignee: SAP SE, Walldorf (DE)

( * ) Notice: Subject to any disclaimer, the term of this patent is extended or adjusted under 35 U.S.C. 154(b) by 307 days.

(21) Appl. No.: 14/692,003

(22) Filed: Apr. 21, 2015

(65) Prior Publication Data
US 2016/0314301 A1    Oct. 27, 2016

(51) Int. Cl.
  G08B 23/00    (2006.01)
  G06F 12/16    (2006.01)
  G06F 12/14    (2006.01)
  G06F 11/00    (2006.01)
  G06F 21/57    (2013.01)
  G06F 21/14    (2013.01)

(52) U.S. Cl.
  CPC ............ *G06F 21/577* (2013.01); *G06F 21/14* (2013.01); *G06F 2221/033* (2013.01)

(58) Field of Classification Search
  CPC ... G06F 21/577; G06F 21/14; G06F 2221/033
  USPC .......................................................... 726/25
  See application file for complete search history.

(56) References Cited

U.S. PATENT DOCUMENTS

| | | | | |
|---|---|---|---|---|
| 6,668,325 B1* | 12/2003 | Collberg | ................. | G06F 21/14 |
| | | | | 713/194 |
| 8,151,349 B1* | 4/2012 | Yee | .......................... | G06F 21/51 |
| | | | | 713/162 |
| 8,806,618 B2* | 8/2014 | Livshits | ................... | G06F 21/54 |
| | | | | 726/22 |

(Continued)

OTHER PUBLICATIONS

Nenad Jovanovic; Pixy: A Static Analysis Tool for Detecting Web Application Vulnerabilities!; 2006 IEEE; p. 1-6.*

(Continued)

*Primary Examiner* — Monjour Rahim
(74) *Attorney, Agent, or Firm* — Fish & Richardson P.C.

(57) ABSTRACT

Implementations of the present disclosure include methods, systems, and computer-readable storage media for receiving, by a SSCA module of a server, source code data based on one or more web pages of a website, analyzing, by the SSCA module, the source code data using static analysis to provide initial results, the initial results including identifiers respectively assigned to one or more variables provided in the source code data, transmitting, by the SSCA module, a request to the website through a proxy server, the request being based on the initial results, the proxy server receiving a response and transmitting a rewritten response to a DSCA module executed on a client, receiving, by the SSCA module, updated source code data from the DSCA module, the updated source code data being provided based on the rewritten response, and updating, by the SSCA module, the initial results based on the updated source code data.

20 Claims, 4 Drawing Sheets

(56) References Cited

U.S. PATENT DOCUMENTS

| | | | | |
|---|---|---|---|---|
| 8,893,294 | B1* | 11/2014 | Steele, III | G06F 17/30902 715/234 |
| 8,935,609 | B2* | 1/2015 | Bauchot | G06F 17/30899 715/234 |
| 9,262,597 | B2* | 2/2016 | Neerumalla | G06F 21/10 |
| 9,405,555 | B2* | 8/2016 | Livshits | G06F 9/4443 |

OTHER PUBLICATIONS

Davide Balzarotti et al., "Saner: Composing Static and Dynamic Analysis to Validate Sanitization in Web Applications," In Proceedings of the 2008 IEEE Symposium on Security and Privacy, pp. 387-401, Washington, DC, USA, 2008. IEEE Computer Society.

Michael D Ernst, "Static and dynamic analysis: synergy and duality," In: Proceedings of the ICSE Workshop on Dynamic Analysis (WODA 2003). Citeseer. 2003, pp. 24-27.

Yao-Wen Huang et al., "Securing Web Application Code by Static Analysis and Runtime Protection," In WWW '04: Proceedings of the 13th international conference on World Wide Web, pp. 40-52, New York, NY, USA, May 17-22, 2004, ACM.

Simon Holm Jensen et al., "Type Analysis for JavaScript," In: Proc. 16th International Static Analysis Symposium (SAS). vol. 5673. LNCS. Springer-Verlag, 2009, 18 pages.

Matias Madou et al., "Watch What You Write: Preventing Cross-Site Scripting by Observing Program Output," In: OWASP AppSec 2008 Conference (AppSecEU08), May 2008, 14 pages.

Markus Mock, "Dynamic Analysis from the Bottom Up,"In: Proceedings of the ICSE Workshop on Dynamic Analysis (WODA 2003). Citeseer, 2003, pp. 13-16.

Sooel Son, et al., "The Postman Always Rings Twice: Attacking and Defending postMessage in HTML5 Websites," In: Network and Distributed System Security Symposium (NDSS'13), 2013, 14 pages.

Zacharias Tzermias et al., "Combining Static and Dynamic Analysis for the Detection of Malicious Documents," In: Proceedings of the Fourth European Workshop on System Security. ACM. 2011, 6 pages.

'jslint.com' [online]. Crockford, "JSLint, The JavaScript Code Quality Tool," 2002, [retrieved on Mar. 24, 2015]. Retrieved from the internet: URL<http://www.jslint.com/. 2 pages.

'JSPrime.com' [online]. Nishant Das Patnaik and Sarathi Sabyasachi Sahoo, JSPrime, a javascript static security analysis tool, 2013, [retrieved on Mar. 24, 2015]. Retrieved from the internet: URLhttp://dpnishant.github.io/jsprime/. 2 pages.

* cited by examiner

COOPERATIVE STATIC AND DYNAMIC ANALYSIS OF WEB APPLICATION CODE FOR FINDING SECURITY VULNERABILITIES

BACKGROUND

Static Source Code Analysis (SSCA) is a technique that statically analyzes program source code to detect problems within the source code. That is, SSCA performs such analysis without actually executing (running) the source code. In some examples, problems within the source code can compromise the security of a computer program. Such problems can be caused by unchecked (un-validated) data-flows from a sink (e.g., input from a user) to a source (e.g., access to a database). Dynamic Source Code Analysis (DSCA) is a technique that dynamically analyzes program source code, while the source code is executing (running).

SSCA and DSCA have respective strengths and weaknesses. For example, SSCA may be prone to a relatively higher number of false positives (e.g., falsely indicating an error in the source code), and DSCA may be prone to a relatively higher number of false negatives (e.g., missing an error in the source code).

SUMMARY

Implementations of the present disclosure include computer-implemented methods for combined static and dynamic analysis of source code, the methods being performed by one or more processors. In some implementations, methods include actions of receiving, by a static source code analysis (SSCA) module executed on a server-side computing device, source code data based on one or more web pages of a website, analyzing, by the SSCA module, the source code data using static analysis to provide initial results, the initial results including identifiers respectively assigned to one or more variables provided in the source code data, transmitting, by the SSCA module, a request to the website through a proxy server, the request being based on the initial results, the proxy server receiving a response and transmitting a rewritten response to a dynamic source code analysis (DSCA) module executed on a client-side computing device, receiving, by the SSCA module, updated source code data from the DSCA module, the updated source code data being provided based on the rewritten response, and updating, by the SSCA module, the initial results based on the updated source code data.

These and other implementations can each optionally include one or more of the following features: the source code data is received from a first browser extension of the DSCA module; the updated source code data is received from a second browser extension of the DSCA module; the DSCA module executes source code of the website based on the rewritten response to provide the updated source code data; the proxy server performs operations including: receiving the response, receiving source code data based on the response, and providing the rewritten response based on the source code data; receiving the source code data includes: querying, by the proxy server, a database that stores the initial results, receiving a query response from the database, and determining that the query response indicates that source code of the website had been analyzed by the SSCA module, and in response, querying the database for one or more identifiers that occur in the source code, the rewritten response being based on the one or more identifiers; and the source code includes JavaScript.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
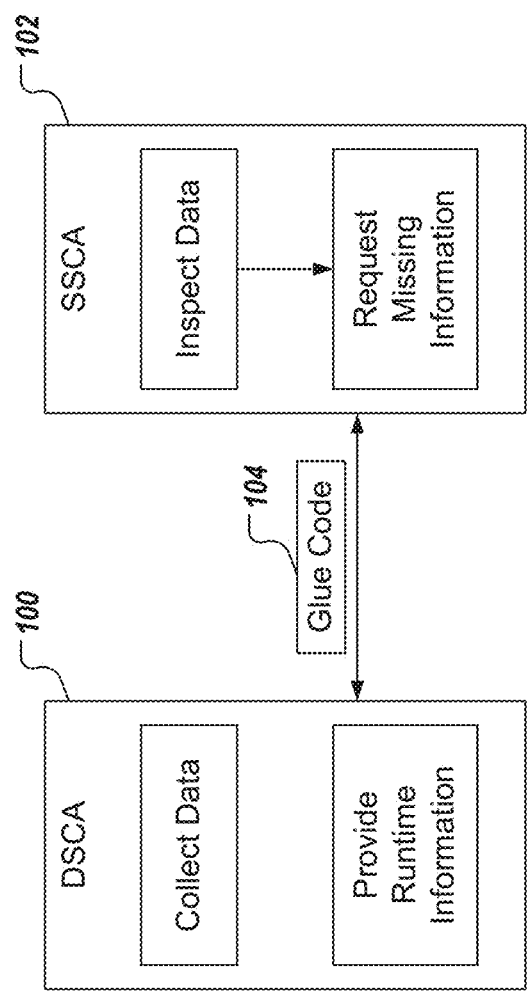
FIG. 1 depicts examples modules in accordance with implementations of the present disclosure.

Implementations of the present disclosure are generally directed to combining static and dynamic analysis to examine source code (e.g., HTML, JavaScript of a website) and detect security vulnerabilities. Some implementations address client-side vulnerabilities caused by, for example, web programming languages (e.g., JavaScript). More particularly, implementations of the present disclosure provide for interoperability and combination of static analysis of source code and dynamic runtime security testing to leverage respective weaknesses of the individual approaches.

Computer program security testing approaches utilize either static source code analysis (SSCA) of a program's source code or dynamic source code analysis (DSCA) of the running program. In some examples, SSCA uses the text of the source code to perform the analysis, while DSCA executes the source code to perform the analysis.

SSCA is the examination of source code without executing it. An example of a static code analysis tool is an Integrated Development Environment (IDE), which is an editor that supports the development process. For example, an IDE can perform syntax highlighting, and can report errors like missing semicolon or code completion. The fact that no execution is needed for static analysis is advantageous, because errors can be detected even in a state in which the source code is not yet ready to be executed.

Moreover, static analysis makes statements about the source code that are true for every execution For static analysis, a model of the source code is built, on which the static analysis is performed. Due to source code coverage and the independence of any execution, static analysis takes as many execution possibilities into account as possible. Code coverage is a classification number that indicates which parts of a program were, in fact, executed or, in this, case examined. The model that is built for the analysis contains only important information. Any unnecessary characters such as whitespaces, comments and brackets are removed. A parse tree is built, which is a precise representation of the original code. During the build process of the parse tree, additional information may be added which makes the parsing process easier, but which also bloat the tree and are actually not needed for the subsequent analysis. The abstract syntax tree (AST) disposes of the additional data and simplifies the representation of the source code constructs. Consequently, the static analysis can be performed more easily and quickly.

A control flow graph represents source code as a graph displaying all possible paths of execution. Therefore, each code block is represented as a node and different nodes are connected by edges. For example, a program may contain a conditional expression, resulting in at least two different blocks (e.g., an if-statement consisting of a body and the alternate else-branch, where the if- and else-bodies are two different execution paths, because either the one block or the other is executed, depending on the conditional expression of the if-statement).

Call graphs are built to perform subsequent analyses about which functions call which other functions and which functions are called from where. The call graph enables static analysis to keep track of the data flow not only inside functions, but also between functions. The goal of data flow analysis is to determine where values are assigned to variables and where the variables are used. Data flow analysis can be very complex due to the scope of variables which can cause difficulties. The scope describes the area in which a variable can be accessed. Depending on the programming language, a variable that is defined in a function could be accessed in the function itself or throughout the entire program. Variables may have different scopes (e.g., local scopes inside of methods or functions, to global scopes reachable from everywhere in the program.

Despite the scope issue, another problem that makes static analysis more complex is assignment. Often variables are assigned to other variables and so they point to the same memory area. If this is the case, the same data can be accessed by using different variables or pointers, which is called pointer aliasing. Such assignments and usages have to be tracked to avoid losing any information. This tracking is called pointer alias analyzing or information flow analysis.

Taint propagation (taint analysis) is a sub-category of data flow analysis and investigates the flow of data that comes from user input. Taint propagation makes it possible to determine whether data comes from a source and possibly can reach a sink. A source is a place in the source code where user controlled data is inserted into the source code Sinks are places where such user controlled data is used in a risky way without making sure that it is valid and secure. With respect to security, user controlled data is very critical, because an attacker has full control over it. The way a program handles this data is relevant for its security.

Another technique is symbolic execution. When performing symbolic execution, a data flow graph is built. For every point in the graph where a decision for one path has to be made, the condition predicates are stored. Also, assignment statements are stored. Before this list of decision points and assignment expressions are traversed, input variables are replaced by symbols instead of having actual values. Next, the assignment expressions are evaluated using the symbols. When the traverse ends, the output of the program is represented by symbolic inputs. In this manner, statements can be made for which input specific paths are executed.

In summary, static analysis uses trees and graphs that are built based on the source code. These logical representations makes it possible to investigate the complete source code, reaching a full code coverage and thus perform further examinations.

DSCA is performed on running code, and as a result, can provide information about the execution time, memory usage and even which code parts are truly executed and which ones are not. Dynamic analysis can also inspect external impacts that could change the behavior of the source code, for instance, configuration files and other settings of the code landscape, user input and further external factors. An example of a DSCA tool includes debuggers, which is a program that can stop the execution of a running program on so-called breakpoints, on which, for example, variable values and the execution trace can be inspected. Using debuggers, developers can analyze running applications.

As with SSCA, DSCA can perform taint analysis, which inspects the data that comes directly from user input. Whereas static analysis uses the described flow graphs to perform this examination, dynamic analysis uses different methods. For dynamic taint analysis, additional information is added to data coming from user input. This can be implemented by extending native data structures, but can complicate the analysis process. The additional information makes it possible to identify such data at every moment of execution. When data reaches a sink, it can be determined whether the data is derived from user input.

Symbolic execution is discussed above with respect SSCA. So-called forward symbolic execution is categorized as a dynamic analysis technique that is used to increase code coverage. Instead of assigning specific values to a variable, only symbols are assigned which are not specific, but can be transformed into every possible value. Consequently, it can be decided which path is taken. A full code coverage could be reached when multiple runs are made and thus all paths are executed.

Frequency Spectrum Analysis (FSA) is a technique that measures which code parts are executed how often. Besides measuring the frequency of code parts, it is also checked whether a correlation between the frequencies of different code paths exists. Dynamic analysis can provide very precise information, as it has access to real values of the running code. On the other hand, it is difficult for dynamic analysis to guarantee that the entire code was analyzed, because only executed code is being investigated.

Both SSCA and DSCA are helpful and support the process of writing code and detecting errors. Both SSCA and DSCA, however, can report false positives that are incorrectly highlighted as an error, and false negatives that are vulnerabilities not found by the analyses. In some examples, an analysis tool that does not produce any false negatives is called sound. It can occur that the number of false positives increases when the number of false negatives decreases due to more restrictive rules.

SSCA is prone to false positives, because SSCA is based on assumptions about the source code. Consequently, secure source code could be incorrectly marked as being insecure due to wrong assumptions. In contrast, DSCA may produce a lower number of false positives due to DSCA's ability to access true values and other runtime information. The number of false negatives, however, could be higher due to the fact that DSCA cannot guarantee a full source code coverage (e.g., not all parts of the source code are executed during DSCA).

Accordingly, source code analysis tools seek a balance between false positives and false negatives, if they cannot be completely avoided in the first place. The more errors an analysis tool reports to the user, the more difficult it is to work with the data and to find the relevant errors. If the source code analysis tool inspects code and displays a list of detected security vulnerabilities as output, the time spent on resolving the indicated issues depends on the size of the list. If the list contains a lot of false positives, time is wasted and the chance that important information will be missed is higher.

Depending on the scenario and the required information, the differences between SSCA and DSCA are taken into account. In the case of DSCA, knowing how to trigger every portion of the source code for execution can be complicated. While source code execution is needed for DSCA, it is not necessary for SSCA. Source code coverage is a larger issue for DSCA as compared to SSCA. Another difference is that statements made by SSCA are true for every execution, while statements made by DSCA are only true for particular executions. On the other hand, DSCA detects truly processed data and does not have to make assumptions (e.g., values of variables), as required by SSCA. The more complex the source code is, the more difficult it is for SSCA to maintain the scope of the program, whereas DSCA can always access the current scope of the program and values of variables.

As described in further detail herein, implementations of the present disclosure combine SSCA and DSCA, such that the respective disadvantages are countered and the respective advantages are emphasized.

Implementations of the present disclosure will be described herein with reference to an example context. The example context includes security testing of source code of websites. It is appreciated, however, that implementations of the present disclosure can be applicable in any appropriate context.

In the example context, websites can include one or more resources (e.g., web pages, files) that are available through the web (Internet). A Uniform Resource Locator (URL) is a character sequence that uniquely identifies resources on the web and, therefore, makes them accessible over the web. The URL is a specific kind of a Uniform Resource Identifier (URI), which identifies resources (e.g., a web page), but does not provide any information about where these resources can be found. Every URL must follow a standardized structure (e.g., a schema part, a schema-specific part) to enable programs to process it accurately. An example schema is the Hypertext Transfer Protocol (HTTP) schema. The schema part of the URL indicates the protocol (e.g., HTTP), which is used to determine the structure of the remaining part, the schema-specific part, of the URL. Using this information, a program (e.g., a web browser) is able to interpret the schema-specific part correctly, and request the respective resource (e.g., using an HTTP request).

HTTP is a protocol that is used to transport hypertext files (web resources), such as web pages. HTTP is based on a stateless request-response cycle. Stateless means that every request is sent independently, and HTTP does not enable identification of requests from the same client. A website, for example, can be requested by a client (e.g., a computing device executing a web browser) by sending an HTTP request to the server. The server delivers the website by sending an HTTP response. A secure variant of HTTP is called Hypertext Transfer Protocol Secure (HTTPS). The difference between HTTP and HTTPS is that the HTTPS is encrypted using the security protocol Transport Layer Security (TLS).

Continuing with the example context, a website is made up of one or more web pages. Hypertext Markup Language (HTML) is a declarative language that is used to describe the structure of websites. Each web page of a website includes a head area and a body area marked by respective HTML tags (e.g., <head>, <body>). The head part contains meta information, the title and resources, such as JavaScript and Cascading Style Sheets (CSS). The body part carries the content of a page that is to be displayed, and can also contain JavaScript or CSS. CSS is used to pass layout information to the web browser rendering the web page.

Early web pages were static and their main purpose was to display content and to provide links to other web pages and/or websites. After a period of time, web pages became dynamic and can, for example, respond to user actions. Web-based scripting languages have been developed, and JavaScript became the most popular and widespread. For example, JavaScript enabled the provision of more sophisticated web applications. JavaScript is interpreted by web browsers to execute code on the client-side, which enables websites to react to user input. For example, the content of the page can be changed or input can be validated using JavaScript. An advantage is that the server does not have to be requested for every action. An HTML website can include JavaScript by loading it from an external source or by directly written into the source code of the website.

A Document Object Model (DOM) is an Application Programming Interface (API) for HTML documents. The DOM represents the logical structure of a respective document as a tree. For every browser window, tab and frame a new window object, and thereby a new DOM is created. With the help of the DOM, elements of a website can be addressed, altered and extended by JavaScript. That means, for example, that the different nodes of the DOM tree and their values can be read and changed by using JavaScript As websites and the functionality they provide have become more complex, the risk of security vulnerabilities and attacks by malicious users has increased. Earlier, attackers focused on servers, which deliver web resources. However, the focus of attacks has shifted to the client-side (e.g., computing devices executing web browsers). To prevent such attacks, multiple factors are considered. For example, in addition to the user's awareness of dangers and security, the source code of an application should be designed to inhibit abuse. Developing secure source code is complicated and the more complex a program and its underlying source code become, the more difficult it is to consider every possible weakness and to keep the source code completely secure.

In view of this, techniques and tools have been developed, which enable the detection of security holes in source code. One such technique is source code analysis, which includes SSCA and DSCA. For both SSCA and DSCA, tools exist, which can be used during and after the development process. They do, however, have limits. Static analysis, for example, only works with the source code, and is only able to make assumptions about runtime behavior of the source code. In contrast, dynamic analysis is performed during execution of the source code, enabling it to access runtime information. Consequently, dynamic analysis does not have to make assumptions about values or input. Dynamic analysis, however, has limited source code coverage. That is, dynamic analysis can only examine truly executed source code. Consequently, not every part of the source code might be analyzed.

Web programming languages, such as JavaScript, also present challenges. SSCA of JavaScript is a very difficult due to language-specific characteristics (e.g., dynamic typing, no compilation) and usage patterns (minification, dynamic loading of further source code from the Internet during runtime). More particularly, JavaScript has several obstacles that make SSCA difficult due to its type-less and highly dynamic nature. One problem is that a lot of websites minify the JavaScript for speed and data size purposes. During the minifying process, unnecessary characters like white-spaces and comments are removed to decrease the size. Also, variable names may be replaced by shorter variable names. Obfuscation as a type of minifying, because unnecessary characters are removed. In some instances, the goal is not only to minify the source code, but also to make the source code unreadable and, as a result, difficult to understand. This is done, for example, to inhibit copying of the source code.

Table 1 below provides a summary comparison between SSCA and DSCA:

TABLE 1

Comparison of SSCA and DSCA

| | Aspect | SSCA | DSCA |
|---|---|---|---|
| General | Type | Structure | Behavior |
| | Code Coverage | All paths | Executed code |
| | Scope | Available code | Executed code |
| | Runtime Info | Assumptions | Full access |
| | False+ | More Likely | Less Likely |
| | False− | Less Likely | More Likely |
| JavaScript | Access to DOM | No | Yes |
| | Find Functions | Complex | Easy |
| | Reflection | Complex* | Easy |
| | Callbacks | Complex | Easy |
| | Dynamic Info** | No | Yes |
| | Obfuscation | Complex*** | Easy |

*if structure of object changes during runtime
**user input, XHR requests, parameters, etc.
***depends on the type of obfuscation Implementations of the present disclosure combine SSCA and DSCA to complement each other and provide improved analysis results (e.g., less false positives, less false negatives). In some implementations, combination of SSCA and DSCA is achieved using multiple modules. FIG. 1 depicts examples modules in accordance with implementations of the present disclosure. In the example of FIG. 1, a DSCA module 100, a SSCA module 102 and glue code are provided. In some examples, and as described in further detail herein, the DSCA module 100 performs static analysis, the SSCA module 102 performs static analysis, and the glue code 104 connects the modules and their functionalities. In some implementations, the DSCA module 100 and the SSCA module 102 are provided using one or more computer-executable programs (e.g., a source code analysis tool) executed using one or more computing devices.

In some examples, the DSCA module 100 can be provided by a client-side computing device. For example, and as described in further detail herein, the DSCA module 100 can be provided by a web browser application using a plurality of browser extensions. In some examples, the SSCA module 102 can be provided by a server-side computing device. In some examples, the DSCA 100 and the SSCA 102 can communicate with one another over a network (e.g., LAN, WAN, Internet).

As described in further detail herein, the DSCA module 100 and the SSCA module 102 provide specific functionalities that are adapted for their respective strengths. In some implementations, the DSCA module 100 collects data and provides requested runtime information. In some implementations, the SSCA module 102 reviews collected data for structural information and can request missing information from the DSCA module 100. In some examples, the glue code 104 specific to a use case and can be used to access the functionalities provided by the DSCA module 100 and the SSCA module 102 (e.g., to inspect websites). The term "use case" refers to the examination object (e.g., a specific API) that is being analyzed. Because the glue code 104 is specific to the use case, the glue code 104 is created for each different use case.

The combined analysis of the present disclosure will be described in further detail with reference to FIG. 1. Source code (e.g., of a website) is received by the DSCA module 100 and/or the SSCA module 102. The SSCA module 102 performs static analysis to collect structural information of the source code. SSCA is able to reach full code coverage, in that is inspects the complete source code. Accordingly, the SSCA module 102 identifies all variables and/or functions occurring in the source code, identifies any unreachable paths, checks for specific statements in the source code. During static analysis of the source code, the SSCA module 102 can identify data that cannot be evaluated due to missing contextual information (runtime information) (e.g., variable values). If, for example, a variable occurs in a portion of the source code, but is not defined within this portion, static analysis cannot determine the value of the variable. The same applies to all other contextual information, such as values that depend on user input or results of requests (e.g., XMLHttpRequest (XHR)).

In accordance with implementations of the present disclosure, the SSCA module 102 selectively requests context information from the DSCA module 100. In contrast to static analysis, dynamic analysis has access to the DOM and can, therefore, obtain values (e.g., user input, dynamically loaded data). As described in further detail herein, after the contextual information is provided, further inspection of the source code can be performed by the SSCA module 102. Because, in accordance with implementations of the present disclosure, contextual information is provided from the DSCA module 100, static analysis can reduce the need for assumptions. For example, by replacing assumed values with true values, the number of false positives can be reduced.

The DSCA module 100 performs dynamic analysis to provide contextual data. Although static analysis can guarantee full code coverage, inspecting source code of a complete website is highly resource intensive. Consequently, only certain portions of the source code are analyzed. To do so, the portions of the source code have to be detected and extracted from the overall source code (e.g., of a website). In some examples, dynamic analysis is better suited to analyze a source code document (e.g., HTML document) due to its ability to access the DOM and/or use wrapping functions. In this manner, dynamic analysis can track changes in the DOM or dynamically loaded data and thus find portions of the source code of interest. In contrast, static analysis has difficulty in extracting source code from a document (e.g., HTML document) or collect dynamically loaded data due to the inability to access DOM. A function wrapping approach is easier to implement than building any kinds of graphs needed for static analysis.

In some implementations, the DSCA module 100 facilitates sending collected data to the SSCA module 102. When the data is sent, the SSCA module 102 can inspect the data to retrieve structural information as exposed. As discussed above, dynamic analysis can only inspect code that is truly executed, whereas static analysis can examine the entire code it has access to. By sending the code to the SSCA module 102 for structural inspection, the number of false negatives, which are more likely produced by dynamic analysis due to not having full code coverage, can be decreased.

In some implementations, the DSCA module 102 provides, when requested, missing information. To be able to provide runtime information, dynamic analysis requires the code to be executed. In some examples, every time runtime information is requested by for static analysis, the web page code (e.g., JavaScript is executed). When the DSCA module 100 collects the requested information, the DSCA module 100 can either update the results of the SSCA module 102 (e.g., to make the results more precise), or can provide the data to the SSCA module 102 again. This could be done, for example, if the SSCA module 102 is to inspect the provided runtime information. If the SSCA module 102 needs additional context information, it sends a new notification to the DSCA module 100. This can be repeated until the initial code snippet and all subsequently sent information have analyzed. Accordingly, a back-and-forth process is provided, whereby static analysis can provide and request information to and from dynamic analysis and vice-versa.

As discussed above, the glue code 104 is the use case specific part of the analysis. In some examples, the glue code 104 is created for each use case and required results. In some examples, already existing glue code 104 is altered or extended. Depending on the use case, the DSCA module 100 and/or the SSCA module 102 may also be extended. In some examples, the DSCA module 100 finds the correct code parts. If, for example, postMessageHandler should be investigated the DSCA module 100 wraps the addEventListener function. If, for example, eval is to be investigated, the DSCA module 100 wraps and fins eval statements. In some examples, the static analysis part has to be extended depending on the required structural information.

In some implementations, the glue code 104 accesses the APIs provided by the DSCA module 100 and/or the SSCA module 102 to use their specific functionalities. In this manner, the glue code 104 is able to determine the order in which static and dynamic analysis are performed. In some examples, and depending on the use case, the glue code 104 could also use only one of both approaches or only some functionalities. For example, the glue code 104 could first access the API of the DSCA module 100, which extracts certain code that is subsequently sent to the SSCA module 102. The SSCA module 102 examines the code, requests runtime values of variables and continues the analysis. After completing the static analysis, the SSCA module 102 stores the results (e.g., in a database).

Figure 2:
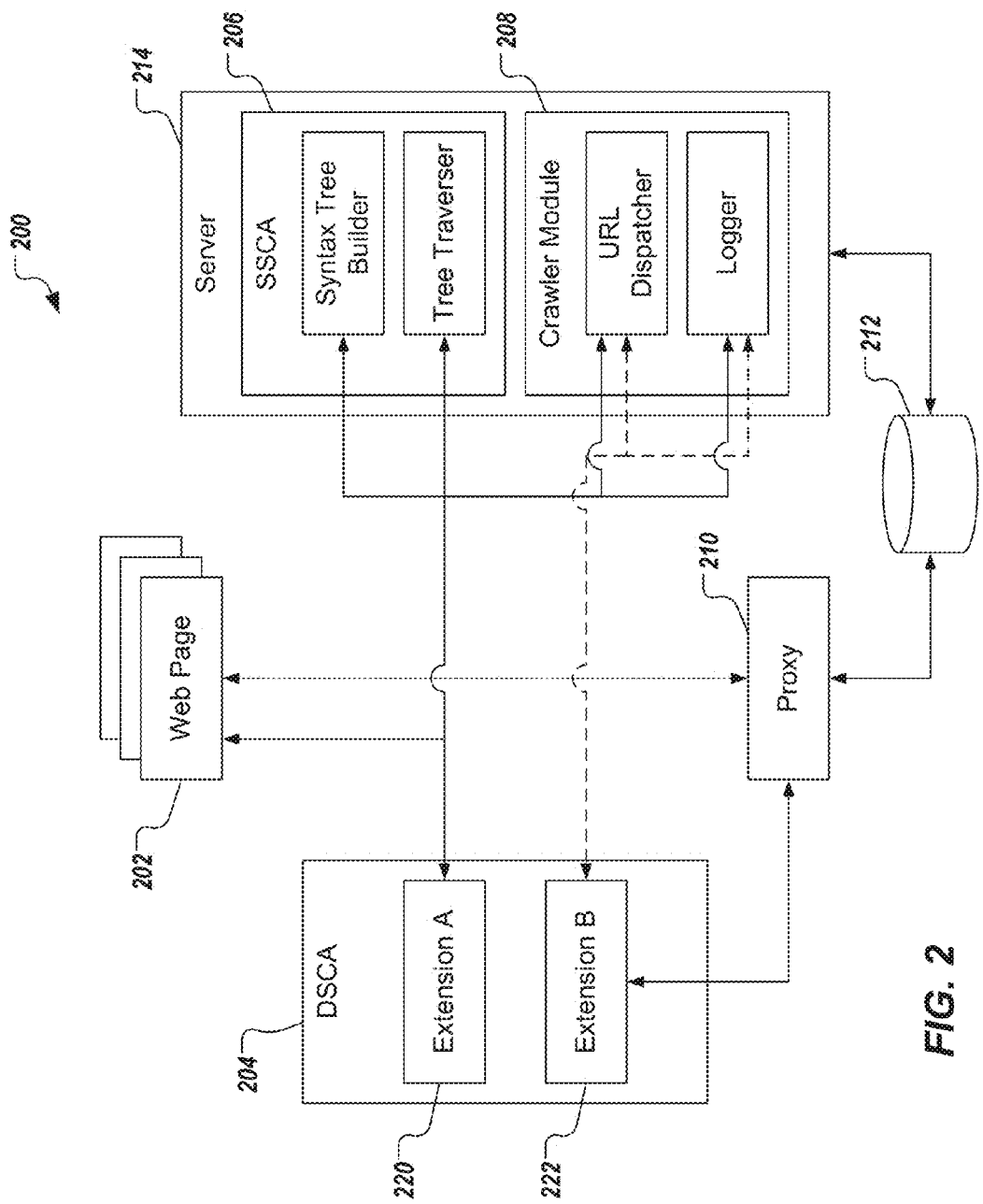
FIG. 2 depicts an example system architecture in accordance with implementations of the present disclosure.

FIG. 2 depicts an example architecture 200 in accordance with implementations of the present disclosure. The example architecture 200 includes a plurality of web pages 202 (e.g., of a website), a DSCA module 204, a SSCA module 206, a crawler module 208, a proxy 210, and a database 212. In some examples, the plurality of web pages 202 are hosted by a server. In some examples, the DSCA module 204 can be provided by a client-side computing device. For example, and as described in further detail herein, the DSCA module 203 can be provided by a web browser application using a plurality of browser extensions. In some examples, the SSCA module 206 can be provided by a server-side computing device. In some examples, the SSCA proxy 210 can be provided by a server-side computing device. In some examples, the DSCA module 204 and the SSCA module 206 can communicate with one another over a network (e.g., LAN, WAN, Internet).

In some implementations, and as described herein, the DSCA module 202 can access the plurality of web pages 202 over the network. In some implementations, and as described herein, the SSCA module 206 can access the plurality of web pages 202 over the network. In some examples, the SSCA module 206 can access the plurality of web pages 202 using the proxy 210.

The example architecture 200 is able to perform both static analysis and dynamic analysis, as described herein. The example architecture 200 is constructed, such that static analysis and dynamic analysis are provided in different iterations, which are performed successively. Both runs are performed by different dynamic analysis modules, referred to as Extension A 220 and Extension B 222. In some examples, Extension A 220 and Extension B 222 are provided as extensions to a web browser application.

In some implementations, and in a first iteration, the Extension A 220 visits the web pages 202 that are to be inspected, collects scripts and relevant code snippets and sends them to the SSCA module 206, which analyzes the retrieved code using static analysis. Among other information, the SSCA module 206 examines which identifiers occur in the source code to later receive runtime information about the identifiers. The analysis results are stored in the database 212.

In a second iteration, the Extension B 222 visits the same web pages 202. This time, the proxy 210 is interposed, and rewrites the source code of the requested web page 202. This means that the proxy 210 adds its own code to the original source code. In some examples, the added code is used to receive information about the occurring identifiers that were already examined by the SSCA module 206. In this manner, during the second iteration, the Extension B 222 knows which information is missing and should be provided. When the rewritten code is executed, the Extension B 222 can collect the needed information and update the results of the first iteration in the database 212.

To be able to detect security vulnerabilities, a DSCA module must have the ability to interact with JavaScript code during its execution (runtime). This requirement restricts the range of suitable programming languages and ways to implement dynamic analysis. For executing and interacting with websites and JavaScript code, different possibilities exist. On one hand, there is the possibility of creating a browser extension, which can, for example, be written by using web technology such as HTML, CSS and JavaScript. Thus, a browser extension is written by using the same technology as the web pages, and hence a homogenous landscape is provided. Browser extensions can access websites, their contents and code by accessing and transforming the DOM.

Because static analysis is performed on source code only, a SSCA module does not have the need to interact with running code itself. The SSCA module simply works with the text of the source code. Consequently, the SSCA module can be written in any appropriate programming language. As discussed above, a parse tree is derived from the source code. It would be advantageous if an already existing library could be used for this task. Consequently, a programming language can be used, for which such a library already exists.

As discussed above with reference to FIG. 2, two different extensions (e.g., web browser extensions) are provided. In some examples, a first extension (e.g., Extension A 220) includes a popup file, a background script file and multiple, different content script files. In some examples, a second extension (e.g., Extension B 222) reuses the popup file, the background script file and a subset of the content script files of the first extension, as well as an additional background script. In some examples, the files of the extensions are linked together by the respective manifests.

Table 2 below provides a summary of the script files of the respective extensions:

TABLE 2

Extension Modules

|  | Module | Extension A | Extension B |
|---|---|---|---|
| Background | Crawler Module | X | X |
|  | Proxy Module |  | X |
| Content | Main Module | X | X |
|  | Crawler Module | X | X |
|  | Wrapper Module | X | X |
|  | Script Collection Module | X |  |
|  | Result Handler | X |  |
|  | Extension Communicator Module | X | X |
|  | Server Communicator Module | X | X |

In accordance with implementations of the present disclosure, the extensions collect all relevant data from particular web pages, provide runtime information, build the syntax tree, and collect data based on the syntax tree. Further, autonomous crawling of websites and sending analysis results to the server for storage are performed. With respect to crawling, a crawler is able to visit web pages automatically, if a set of URLs is provided to it. The administration of this process is done using a crawler module (e.g., the crawler module 208 of FIG. 2), which is used by both extensions. In some examples, the crawling process is started by a user interaction, which notifies the background script to start the crawling process. The background script contacts the server and gathers the URLs to be crawled. In the next step, the background script opens a predefined number of tabs in the browser. In some examples, the background script passes a URL to each tab which starts to load the web page. Before the web page starts to load, the content scripts are activated, which are responsible for the dynamic analysis. Whenever a content script of a web page finishes its analyses, the background script is notified. Subsequently, the background script sends a new URL, the respective web page is loaded and the process starts again. In some examples, the background script sets an individual timer for each tab. When the tab times out, the background script is notified, the tab process is destroyed, a new tab is created and a new URL is passed to it. This keeps the crawling process alive and avoids that the background script waits indefinitely for a tab that cannot open the specified URL due to an unreachable site, a page that does not stop to load or the fact that the tab process itself crashed. This timer can be set such that as few web pages as possible are skipped (e.g., five minutes for each tab).

In some examples, a background script can only communicate with a content script through messages and vice-versa, because they cannot directly access each other's functions. Accordingly, a background script and a content script can each implement a message listener, if they want to receive messages. In some examples, the web browser automatically adds additional information to every sent message. Using the additional information, the background script can determine which tab sent the message and can pass a new URL to the correct tab.

Besides assigning new URLs to the tabs, the background script also logs their status and any occurred errors. When a tab loads a website, a status code of the site is sent to the background script. The background script sends information about the URL, the status code and the loading time of a tab to the server. If the status code indicates an unsuccessful loading of a website, the tab is also recreated and receives a new URL. When an error occurs during the crawling process, the background script sends the error text to the server, which stores it in the database. If an error occurs in one of the content scripts, the content script sends the message to the background script, which forwards the message to the server. The background script acts as a single point of contact and the contact to the server does not need to be implemented in every single content script. When all websites are visited, the crawling process stops.

Another background script, referred to as proxy module, is only used by the second extension (e.g., Extension B 222 of FIG. 2). Instead of directly accessing the servers of the web pages, every request is redirected to a proxy (e.g., the proxy 210 of FIG. 2). The proxy is used to modify the content of the requested web pages. Furthermore, the background script deletes any cached data before the request is made. Cached data is data that the web browser has stored in case the same resource is requested again in the future. Instead of contacting the server again for the same resource, it takes the data from the cache. In this manner, the web browser can display the requested resource quicker and avoids unnecessary traffic. Because the original data is to be modified by the proxy, the request should be answered by the server and not by any cached data. Consequently, the cache of the web browser is emptied before the request is made.

As discussed above, the extensions include different content script files, each having its own task. In some implementations, a main module is one part of the glue code, described above, and acts as the extension's engine. The main modules of both extensions can differ, depending on the use case. In some examples, the main module consolidates the results of the different extension modules and sends the results to the server. After the results are sent, the main module signals that the next web page can be opened. The content scripts of an extension are executed for each window object of a web page, and results are collected for all window objects.

The crawling process continues, however, when the top window of a web page finished its analyses. When a sub-window (e.g., an embedded iframe) finishes its analyses, the results are stored, but the tab does not receive a new URL. The other modules are designed in a modular way making it possible to easily reuse them in different extensions. In some examples, they register themselves as plugins in the extension communicator module. In some examples, the main module of an extension can register itself in the same module as a plugin listener. In this manner, the main module tells the extension communicator module from which plugin it wants to receive results and which function shall handle the results. The result handler administrates the number of plugins the main module expects results from. When all plugins have reported their results, the result handler notifies the main module that every plugin is finished.

In some examples, the server communicator module is the mediator of the extension and the server, contains the address and the port under which the server can be accessed and administrates the connection. Consequently, the server connection has to be maintained in only one function and not in any other module.

In some examples, the content script crawler module is the counterpart of the module with the same name in the background script (see Table 2). It is notified from the main module when the next web page is to be visited, and contacts the background crawler module, which provides a new URL to the tab as described above.

In some examples, the script collection module collects the inner scripts and the external scripts of a website. When a website finishes loading, an onload-event is usually fired by the web browser. After this event is fired, the script collection module searches for all scripts in the website. However, elements of a web page could already be deleted during the parsing process. Consequently, the moment that the onload-event is fired, some elements may no longer exist. To collect all scripts that appear during the parsing process and not to miss any that may be deleted before the parsing process ends, a mutation observer is used. In some examples, the mutation observer is a web browser API that fires an event every time the DOM of a website changes. Besides reacting on the onload-event, the script collection module also searches the websites for scripts every time such an event occurs, thus, being able to collect them even before they may be deleted. When a <script> tag is collected, it is marked to prevent collecting the same tag twice. After the onload-event has fired and the final search for scripts has ended, the detected scripts are divided into categories: inner scripts and external scripts. It may happen that the onload-event never occurs for a website due to loading a lot of resources or that the event is overridden or blocked. As a consequence, dividing the collected scripts into categories can be triggered after a set timer expires. In some examples, the division is done by checking if the src-attribute of the <script> tag is set. If it is set, it is an external script that loads its content from the specified URL. If the attribute is not set, it is an inner script and the <script> tag already contains the code, which can easily be extracted. The external scripts have to be loaded by the extension to get access to the source code. Therefore, an XHR request is made for every external script tag. It is possible that not every external source can be loaded due to unreachable hosts or other problems. Therefore, another timer is set for every external script, where a timeout is used to stop loading the script and the value of its source code is set to, for example, 'Did not load in time' to be able to identify such scripts within the database. After each external script is loaded, or its timer completed, the code of every inner script and every external script is sent to all modules that listen to the results of the script collection module.

In some examples, the wrapping module is used by the content script to inject code into the web page. When the code is injected into the web page, the web browser executes the injected code. This has to be done when, for example, the content script wants to change some code functionalities of the web page. In some examples, if the content script wants to wrap a function of the web page, the wrapping code has to be injected into the web page, because the content script is executed in an isolated context. As a result, running the wrapping code in the content script would not wrap the addEventListener-function of the web page, but of the content script itself. When a web page registers an eventListener by calling, for example, window.addEventListener after the wrapping code was injected by the content script, it calls the injected function instead of the original one. Depending on the wrapped code, its functionality and investigated use case, the wrapper module has to be extended.

Implementations of the present disclosure further provide for server-side SSCA. In some examples, SSCA is performed on the server-side to enable modularization and access to the SSCA by multiple sources. If, for example, someone wants to test whether HtmlUnit receives the same results as an extension, it also could use the SSCA module. In some implementations, the server includes different parts that fulfill respective tasks. Example components of the server include: a connection module, a crawler module, result storage, a SSCA module, and a result provider. In some examples, the server is written in Node.js, which is a server-side implementation of JavaScript, however, some aspects differ. For example, Node.js does not need a website for the code to be included in and as a result the DOM objects do not exist, either. Node.js is a modern implementation and enables very fast and scalable servers to be built due to its asynchronous programming model.

In some examples, the connection module opens a connection and starts to listen to a specific port of the physical instance it is deployed on. Afterwards, a client, in this case the extensions, can send requests to the connection module. In some examples, the crawler module is the server counterpart to the crawler module of the extension, described above. When the background script of the extension requests the URLs that are to be crawled, the server queries the database and passes the URLs to the extension. Additionally, the server takes the status logs and error logs that are sent from the extension and stores them in the database. In some examples, the static analysis module includes a syntax tree builder (see FIG. 2), which builds a syntax tree based on the code that is sent by the first extension (e.g., Extension A of FIG. 2), and a tree traverser (see FIG. 2, which traverses the syntax tree to retrieve the desired information (e.g., determining out which identifiers occur in the code). In some examples, the syntax tree is built by a third-party module. In some examples, before the syntax tree is built, the underlying code is provided to a third-party module, which reformats minified code to make the code easier to read for constructing the syntax tree, and make the location information more precise.

Depending on the required information, the traversing code, for traversing the syntax tree, is implemented in a different manner or is extended. In some examples, to traverse the syntax tree, a recursive function is used. A recursive function calls itself again and again until an abort criterion is met, after which it starts to pass the results back for as long to the previous level as the root is reached. In some examples, the syntax tree is traversed until a node does not contain a successor node (e.g., a leaf node is reached). This path is then finished and the function can return to the previous level to follow the other successive paths until all paths are checked. It can then be returned to the previous level. This is done until all paths are traversed and all desired information is collected. In some implementations, a stack is built to check what the current node of the traversing process is. Whenever the traversing process goes to a successive node, this node is put on top of the stack. Whenever the traversing process goes back to a predecessor node, the current node is popped from the stack.

For rewriting requests and/or responses to/from the server, a proxy can be provided (e.g., the Java Proxy 210 of FIG. 2). In some examples, the proxy is provide in Java (e.g., instead of Node.js) due to the fact that Java already contains some helpful libraries for programming a proxy. As described herein, the SSCA module detects which identifiers occur in the source code and stores their names in the database. These names are later accessed by the proxy to store the runtime values of the respective identifiers. For example, after the first extension (Extension A) has finished its iteration, the second iteration begins, whereby the second extension (Extension B) crawls the same websites as the first extension. During the second iteration, however, requests from the second extension are intercepted by the proxy. The requests from the second extension are forwarded to the server, but the responses from the server are modified. When a response of the server reaches the proxy, the proxy queries the database for the source code or code snippet that was investigated by the SSCA for this particular web page. The response of the server is then searched for the associated code. If the response contains the code, the proxy queries the database again. This time the information about the identifiers that occur in the code is extracted. The proxy modifies the investigated source code by adding its own code to the original source code that passes information about the identifiers to the extension when it is executed by the web browser. Depending on the scenario and the investigated source code, the additional code lines have to be placed differently to get more useful information. After the source code in the response is modified, it is forwarded to the client, where the code is triggered by either the web page itself or by the second extension. When the code is triggered, the added code lines which provide the information and the original code are executed. The second extension can catch the information and send it to the server. The server can update the already collected data with the new runtime information.

Figure 3:
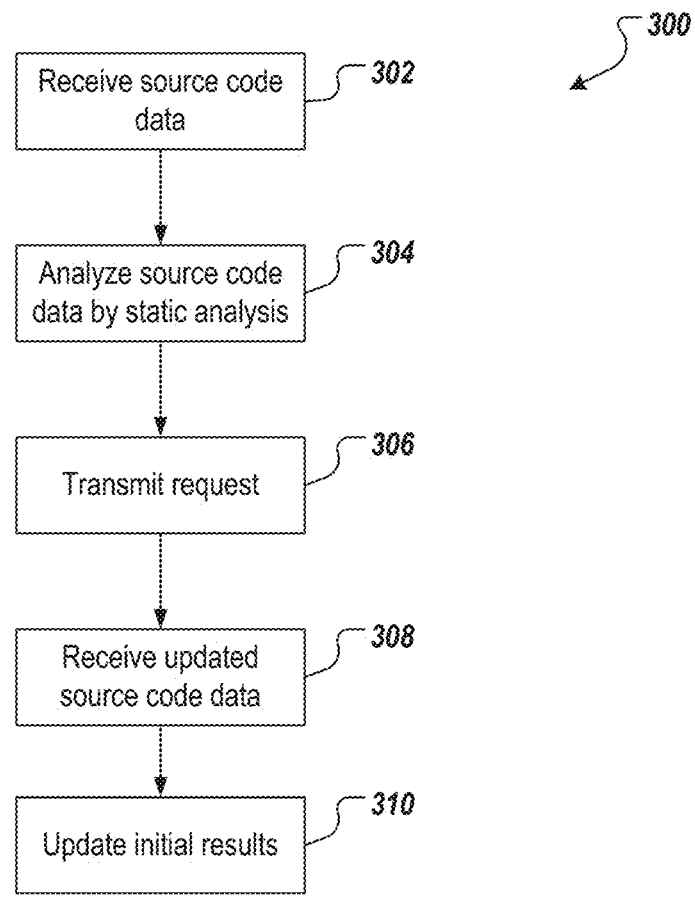
FIG. 3 depicts an example process that can be executed in accordance with implementations of the present disclosure.

FIG. 3 depicts an example process 300 that can be executed in accordance with implementations of the present disclosure. In some implementations, the example process 300 can be realized using one or more computer-executable programs (e.g., a web browser, a server-side application) executed using one or more computing devices (e.g., a client-side computing device, a server-side computing device).

Source code data is received (302). For example, the source code data is received by a SSCA module and is based on one or more web pages of a website. In some examples, the source code data is received from a DSCA module (e.g., a first browser extension). The source code data is analyzed by static analysis (304). For example, the SSCA module analyzes the source code data to provide initial results. In some examples, the initial results include identifiers respectively assigned to one or more variables provided in the source code data. A request is transmitted (306). For example, the SSCA module transmits a request to the website through a proxy server. In some examples, the request is based on the initial results. In some examples, the proxy server send the request to the website and receives a response. The proxy server provides a rewritten response and transmits the rewritten response to the DSCA. Updated source code data is received (308). For example, the updated source code data is received by the SSCA module from the DSCA module, and the updated source code data are provided based on the rewritten response. In some examples, the updated source code data can include runtime values of variables. The initial results are updated (310). For example, the initial results are updated by the SSCA module based on the updated source code data.

Figure 4:
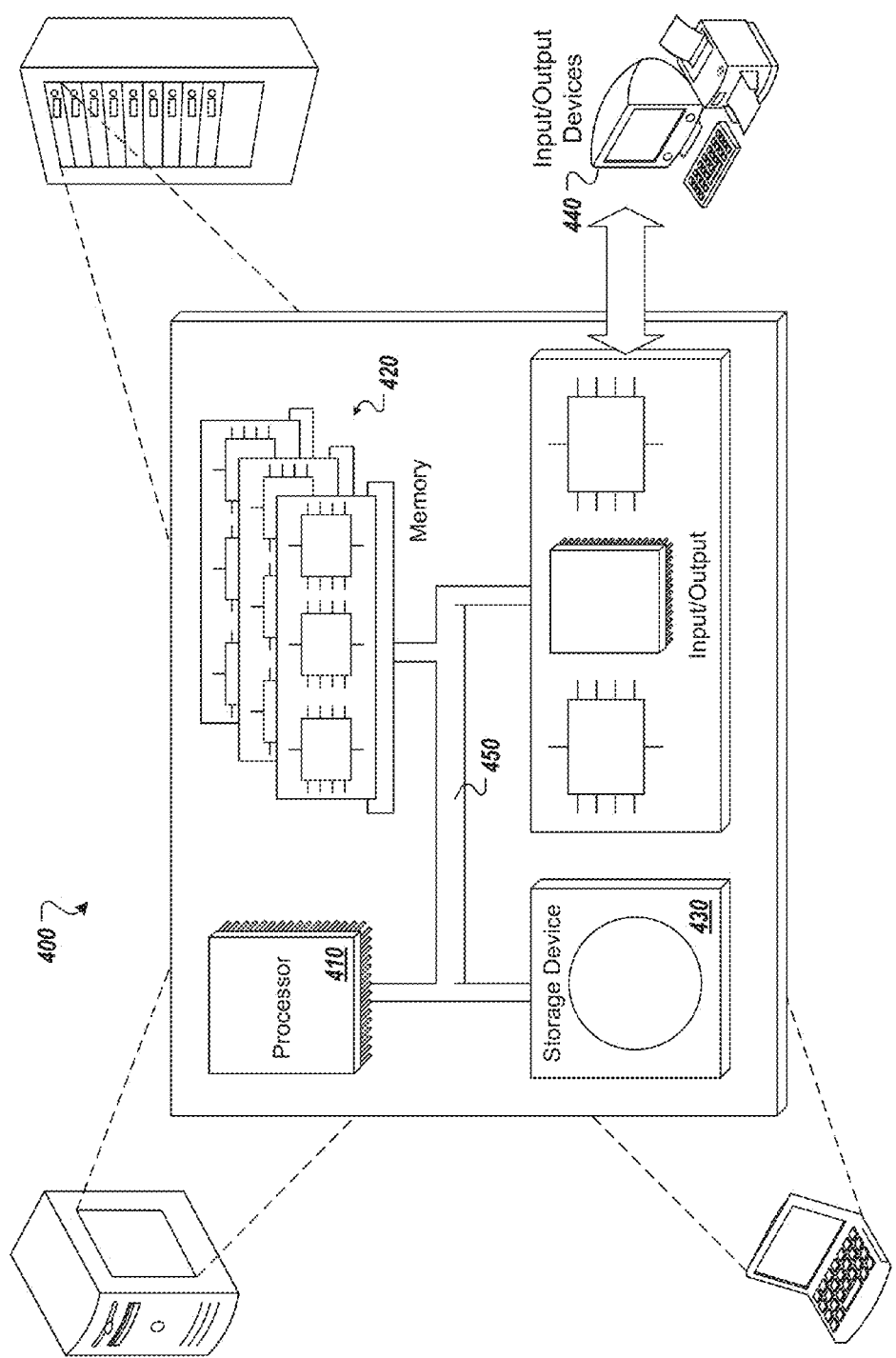
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. Each of the components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device) for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both.

Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for combining static source code analysis and dynamic source code analysis to analyze a website, the method being executed using one or more processors and comprising:
   receiving, by a static source code analysis (SSCA) module executed on a server-side computing device, source code data based on one or more web pages of a website;
   analyzing, by the SSCA module, the source code data using static analysis of a text of the one or more web pages of the website without executing the source code to provide initial results, the initial results comprising identifiers respectively assigned to one or more variables provided in the source code data;
   transmitting, by the SSCA module, a request to the web site through a proxy server, the request being based on the initial results, the proxy server receiving a response and transmitting a rewritten response to a dynamic source code analysis (DSCA) module executed on a client-side computing device, the DSCA module being configured to perform an examination of the source code during an execution of the source code;
   receiving, by the SSCA module, updated source code data from the DSCA module, the updated source code data being provided based on the rewritten response; and
   updating, by the SSCA module, the initial results based on the updated source code data.

2. The method of claim 1, wherein the source code data is received from a first browser extension of the DSCA module.

3. The method of claim 1, wherein the updated source code data is received from a second browser extension of the DSCA module.

4. The method of claim 1, wherein the DSCA module executes source code of the website based on the rewritten response to provide the updated source code data.

5. The method of claim 1, wherein the proxy server performs operations comprising:
   receiving the response;
   receiving source code data based on the response; and
   provides the rewritten response based on the source code data.

6. The method of claim 1, wherein receiving the source code data comprises:
   querying, by the proxy server, a database that stores the initial results;
   receiving a query response from the database; and
   determining that the query response indicates that source code of the website had been analyzed by the SSCA module, and in response, querying the database for one or more identifiers that occur in the source code, the rewritten response being based on the one or more identifiers.

7. The method of claim 1, wherein the source code comprises JavaScript.

8. A non-transitory computer-readable storage medium coupled to one or more processors and having instructions stored thereon which, when executed by the one or more processors, cause the one or more processors to perform operations for combining static source code analysis and dynamic source code analysis to analyze a website, the operations comprising:
   receiving, by a static source code analysis (SSCA) module executed on a server-side computing device, source code data based on one or more web pages of a web site;
   analyzing, by the SSCA module, the source code data using static analysis of a text of the one or more web pages of the website without executing the source code to provide initial results, the initial results comprising identifiers respectively assigned to one or more variables provided in the source code data;
   transmitting, by the SSCA module, a request to the web site through a proxy server, the request being based on the initial results, the proxy server receiving a response and transmitting a rewritten response to a dynamic source code analysis (DSCA) module executed on a client-side computing device, the DSCA module being configured to perform an examination of the source code during an execution of the source code;

receiving, by the SSCA module, updated source code data from the DSCA module, the updated source code data being provided based on the rewritten response; and updating, by the SSCA module, the initial results based on the updated source code data.

9. The computer-readable storage medium of claim 8, wherein the source code data is received from a first browser extension of the DSCA module.

10. The computer-readable storage medium of claim 8, wherein the updated source code data is received from a second browser extension of the DSCA module.

11. The computer-readable storage medium of claim 8, wherein the DSCA module executes source code of the website based on the rewritten response to provide the updated source code data.

12. The computer-readable storage medium of claim 8, wherein the proxy server performs operations comprising:
receiving the response;
receiving source code data based on the response; and
provides the rewritten response based on the source code data.

13. The computer-readable storage medium of claim 8, wherein receiving the source code data comprises:
querying, by the proxy server, a database that stores the initial results;
receiving a query response from the database; and
determining that the query response indicates that source code of the website had been analyzed by the SSCA module, and in response, querying the database for one or more identifiers that occur in the source code, the rewritten response being based on the one or more identifiers.

14. The computer-readable storage medium of claim 8, wherein the source code comprises JavaScript.

15. A system, comprising:
a client-side computing device; and
a computer-readable storage device coupled to the client-side computing device and having instructions stored thereon which, when executed by the client-side computing device, cause the client-side computing device to perform operations for combining static source code analysis and dynamic source code analysis to analyze a website, the operations comprising:
receiving, by a static source code analysis (SSCA) module executed on a server-side computing device, source code data based on one or more web pages of a web site;
analyzing, by the SSCA module, the source code data using static analysis of a text of the one or more web pages of the website without executing the source code to provide initial results, the initial results comprising identifiers respectively assigned to one or more variables provided in the source code data;
transmitting, by the SSCA module, a request to the website through a proxy server, the request being based on the initial results, the proxy server receiving a response and transmitting a rewritten response to a dynamic source code analysis (DSCA) module executed on a client-side computing device, the DSCA module being configured to perform an examination of the source code during an execution of the source code;
receiving, by the SSCA module, updated source code data from the DSCA module, the updated source code data being provided based on the rewritten response; and
updating, by the SSCA module, the initial results based on the updated source code data.

16. The system of claim 15, wherein the source code data is received from a first browser extension of the DSCA module.

17. The system of claim 15, wherein the updated source code data is received from a second browser extension of the DSCA module.

18. The system of claim 15, wherein the DSCA module executes source code of the website based on the rewritten response to provide the updated source code data.

19. The system of claim 15, wherein the proxy server performs operations comprising:
receiving the response;
receiving source code data based on the response; and
provides the rewritten response based on the source code data.

20. The system of claim 15, wherein receiving the source code data comprises:
querying, by the proxy server, a database that stores the initial results;
receiving a query response from the database; and
determining that the query response indicates that source code of the website had been analyzed by the SSCA module, and in response, querying the database for one or more identifiers that occur in the source code, the rewritten response being based on the one or more identifiers.

* * * * *